(12) United States Patent
Khan

(10) Patent No.: US 8,421,842 B2
(45) Date of Patent: Apr. 16, 2013

(54) HARD/SOFT FRAME LATENCY REDUCTION

(75) Inventor: Humayun M Khan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1662 days.

(21) Appl. No.: 11/768,170

(22) Filed: Jun. 25, 2007

(65) Prior Publication Data

US 2008/0316217 A1 Dec. 25, 2008

(51) Int. Cl.
*H04N 7/14* (2006.01)
(52) U.S. Cl.
USPC ..................................... 348/14.12; 348/14.15
(58) Field of Classification Search ............... 348/14.12, 348/14.13, 14.14, 14.15, 21; 345/522, 530
See application file for complete search history.

(56) References Cited

U.S. PATENT DOCUMENTS

| | | | |
|---|---|---|---|
| 5,596,420 A | 1/1997 | Daum | |
| 5,978,023 A | 11/1999 | Glenn | |
| 6,034,733 A | 3/2000 | Balram et al. | |
| 6,037,983 A | 3/2000 | Au et al. | |
| 6,075,543 A | 6/2000 | Akeley | |
| 6,092,116 A * | 7/2000 | Earnest et al. | 709/236 |
| 6,118,498 A | 9/2000 | Reitmeier | |
| 6,192,079 B1 | 2/2001 | Sharma et al. | |
| 6,594,313 B1 | 7/2003 | Hazra et al. | |
| 6,637,031 B1 | 10/2003 | Chou | |
| 6,697,097 B1 * | 2/2004 | Parker et al. | 348/14.12 |
| 6,708,234 B2 * | 3/2004 | Moteki et al. | 710/22 |
| 6,947,100 B1 | 9/2005 | Proebsting | |
| 7,050,096 B2 * | 5/2006 | Porter et al. | 348/231.99 |
| 7,148,861 B2 | 12/2006 | Yelton et al. | |
| 7,154,540 B2 | 12/2006 | Honey et al. | |
| 7,197,581 B2 * | 3/2007 | Kohashi | 710/28 |
| 7,271,831 B2 * | 9/2007 | Sakata | 348/220.1 |
| 7,293,119 B2 * | 11/2007 | Beale | 710/22 |
| 2002/0080267 A1 | 6/2002 | Moluf | |
| 2007/0147517 A1 * | 6/2007 | Hu | 375/240.27 |
| 2007/0230581 A1 * | 10/2007 | Orr | 375/240.21 |
| 2007/0274382 A1 * | 11/2007 | Hickey et al. | 375/240.03 |

OTHER PUBLICATIONS

Liang, et al., "Low-Latency Streaming of Pre-Encoded Video Using Channel-Adaptive Bitstream Assembly", available at least as early as Feb. 16, 2007, at <<http://www.stanford.edu/~bgirod/pdfs/LiangICME2002.pdf>>, pp. 1-4.
Yu, et al., "I/O Strategies for Parallel Rendering of Large Time-Varying Volume Data", available at least as early as Feb. 16, 2007, at http://www.cs.ucdavis.edu/~ma/papers/PGV04.pdf>>, The Eurographics Association, 2004, pp. 1-10.

\* cited by examiner

*Primary Examiner* — Brandon Miller
(74) *Attorney, Agent, or Firm* — Lee & Hayes, PLLC

(57) ABSTRACT

Procedures for minimizing video latency using different frame rates are described. In an implementation, a video captured at a first frame rate is obtained. At least one frame of the video is eliminated and the resultant video, with the eliminated at least one frame is processed as if the video were captured at a slower frame rate than the first frame rate.

19 Claims, 3 Drawing Sheets

HARD/SOFT FRAME LATENCY REDUCTION

BACKGROUND

The quality of real-time media events may be influenced by video latency between media capture, processing, transport and presentation, or end to end latency. While audio data handling may occur with minimal relative delay, video data handling may act as a bottleneck which limits the overall rate at which the event may occur (e.g., the audio/video data being presented in real-time) and impact the overall real-time conference experience. For example, video stream image latency issues may cause the image to jerk or give the video a rough or unsmooth quality, or make the audio appear out of synchronization with the video. Take for example a real-time video in which a participant is waving his/her hand. Inter-video frame latency may result in video display in which the subject's hand/arm may appear to jerk between discrete positions rather than making a smooth fluid motion. Additionally, when recombining audio and video data streams, the audio stream may be delayed in order to match the relatively larger delay for the video data. For example, a speaker's audio input is matched to the video so that movement of the speaker's lips matches the audio presentation.

Moreover, video processing may be central processing unit (CPU) intensive. For instance, increasing the video capture rate may consume CPU capacity and time. Even if the video capture rate is increased, communicating the increased video data may burden network resources.

SUMMARY

Procedures for minimizing video latency using different frame rates are described. In an implementation, a video captured at a first frame rate is obtained. At least one frame of the video is eliminated and the resultant video, with the eliminated at least one frame is processed as if the video were captured at a slower frame rate than the first frame rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to reduce video latency. In implementations, the video latency prior to processing may be minimized by driving the capture device at a first frame rate or speed and eliminating frames prior to processing. Thus, the processor may handle the video as if the video was captured at a second frame rate, which is less than the first frame rate. In this fashion, the end-to-end latency for real-time applications may be reduced without burdening the processor and/or network.

In further implementations, video capture hardware provides video captured at a first frame rate to a direct memory access (DMA). The DMA may drop, or eliminate frames, so that the video is provided to the processor at a second frame rate which is less than the first. For instance, the DMA may eliminate a subsequent frame to be transferred to the processor, when the DMA interrupts the processor with a first frame.

Exemplary Environment

Figure 1:
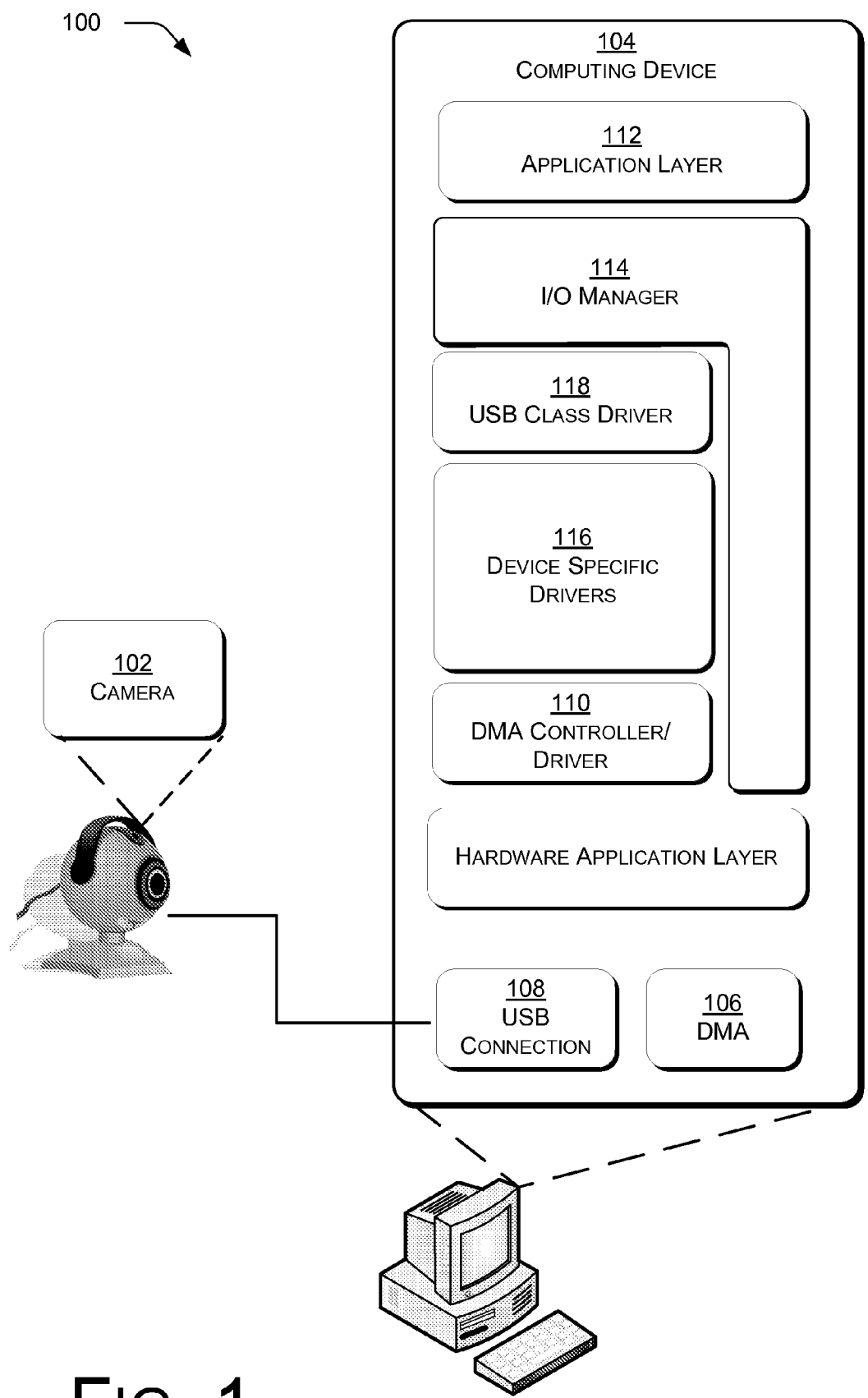
FIG. 1 illustrates an environment in an exemplary implementation that may use technologies to minimize video latency.

FIG. 1 illustrates environment 100 in exemplary implementations that are operable to use a hard and a soft frame rate for minimizing inter-video frame latency. The system may reduce the latency prior to video processing while minimizing the burden on a processor (e.g., the CPU) handling the video data. While a web-camera 102 and computing device 104 are discussed, the principles discussed herein may be used in a wide variety of configurations as desired. For example, a stand-alone webcam including processing capability may be used and so on.

For comparison, a non-compliant system (a system which does not implement the techniques and/or structures, etc. discussed herein) may experience approximately a two frame delay, or greater delay, by the time the video is communicated from an originating system to a destination system. Variations in determined delays may be influenced by a variety of factors that may increase or decrease a determined time. The latency may be generally attributed to the time expended to capture the frame and transmit the frame into a DMA 106. Additional latency may occur during video processing.

For example, a system experiencing a two frame delay when operating at fifteen frames per second (approximately 66.667 milliseconds (msec) per frame) may experience a latency of approximately 133.33 msec before the frame is processed. The additional frame delay may occur from communicating the frame through the universal serial bus (USB) 108 and into the DMA 106 (i.e., received by the DMA 106). For example, additional delay may be attributed to the time expended between commencing frame transfer to a DMA 106 until the frame boundary is determined in the DMA 106 (e.g., the frame has arrived into the DMA 106). In addition to a USB 108, other port mechanisms and protocols may be used as well.

While increasing the capture rate (such as to thirty frames a second) may decrease capture latency between frames, the additional frames may consume CPU time and resources. Additionally, increasing the frame rate may burden a network transmitting the video data and not appreciably increase real-time video quality.

In implementations, a video capture device (such as the web-camera 102) may capture images at a first frame rate while the captured video may be processed as if the video was obtained at a second frame rate, which is lower than the first. For example, a webcam 102 may operate at thirty frames a second or (approximately 33.333 msec per frame). In this instance, the webcam 102 may capture individual images at approximately 33.333 msec intervals. The captured frame may be communicated through the USB 108 to the DMA 106. Subsequent frames, such as a second frame, may be captured and delivered in a similar manner.

The DMA 106 may interrupt the CPU with a process request once the first frame is received. For example, the DMA 106 may interrupt the CPU when the frame boundary is within the DMA 106. A subsequent frame (such as a second in time frame in comparison to the first frame) may be eliminated or dropped prior to processing.

For example, the DMA 106 (based on the DMA controller) may eliminate a subsequent frame arriving at the DMA 106, when the DMA 106 interrupts the CPU (i.e., coextensively in time). Thus, while the first frame may be processed for inclusion in a real-time video, a subsequent frame, arriving as the CPU is interrupted, may be dropped or unused. The DMA 106 may eliminate one or more subsequent frames prior to processing. Additional frames may be eliminated as well. For instance, a DMA controller 110 may direct the DMA 106 to eliminate every other frame prior to processing. The designated DMA configuration may be based on the application layer 112 parameters. Eliminating frames at the DMA 106 may minimize the burden on an application layer 112 as well as the burden on the I/O (input/output) manager 114 and/or the CPU. Additionally, a device specific driver 116 may be included for controlling the webcam 104 in conjunction with a USB 118 class driver for controlling USB type devices. In implementations, the application layer 112, a device specific driver 116 or the like may be implemented to direct the DMA controller 110/DMA 106 to drop the desired frames. For example, a device specific driver may change the second frame rate to match that of the application layer, such as the frame speed requested by a real-time video conference application. While higher layers may be used to configure the DMA/DMA controller, the techniques/hardware discussed herein may be applied by the DMA without burdening the CPU. The number of eliminated frames may vary as desired. For example, two out of three frames may be eliminated, one frame may be eliminated while one is retained and so on.

The number of eliminated frames and the second frame rate may be based on application 112 configuration. Thus, if the application 112 (such as a real-time conferencing application) designates a particular frame rate, the first frame rate may be increased to minimize latency, the number of eliminated frames may be reduced and so on, tailored to the desired second frame rate. In this manner, a higher frame rate video may be processed as if the video included fewer frames. For example, a one second video clip, captured at thirty frames per second, may be converted into fifteen frames. Thus, a system may implement a "hard rate" for a capture device while applying a "soft rate" for data processing. As a result, when processed and/or presented, the remaining fifteen frames (i.e., the fifteen frames which have not been eliminated or dropped) may represent approximately one second of video at fifteen frames per second. In this case, the CPU may process fifteen frames instead of thirty frames. In this manner, the consumed CPU capacity and/or processor time may be reduced in comparison to a common hardware/software frame rate.

In implementations, if the inter frame time (i.e., the interval between frames) is less than an expected inter frame time, a recently captured frame may be eliminated. For example, if the application 112 is to receive frames at 33.33 msec intervals, but the DMA 106 is providing frames at 25.03 msec intervals, an incoming frame may be dropped so that the frames are provided at approximately 33.33 msec intervals. In this way, CPU overhead and network resources may not be consumed beyond that specified for the application 112. For example, in a real-time conference, the inclusion of additional frames beyond that which is designate may not appreciably increase the overall quality of the media event. For example, in a stoic conference call, increasing the frame rate from fifteen frames per second to thirty frames per second may not noticeably increase the quality of the call.

The latency between commencing image capture through processing may be reduced in relation to a common capture rate. Thus, for the foregoing first frame rate of 30 frames per second and a second frame rate of 15 frames per second, the latency may be reduced (presuming common factors) from approximately 133.33 msec to approximately 66.67 msec. Similar latency reductions may be obtained based on the capture frame rate and the frames eliminated prior to processing and as desired.

In implementations, the second frame rate may be at least partially based on the application 112. Thus, the first frame rate, the second frame rate, and the frames being eliminated may vary in accordance with the application 112 parameters. For example, in order to achieve a higher second frame rate without eliminating a greater percentage of frames, the webcam 102 may be driven or operated at a higher frame rate in comparison to a first set of conditions.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory.

The following discussion describes techniques that may be implemented using the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

In implementations, the processor may manipulate the retained images. For example, remaining frames may be averaged, selected regions within the frames may be averaged, and so on. For instance, the CPU may average an "active region" or a region of an image associated with motion.

Exemplary Procedures

Figure 2:
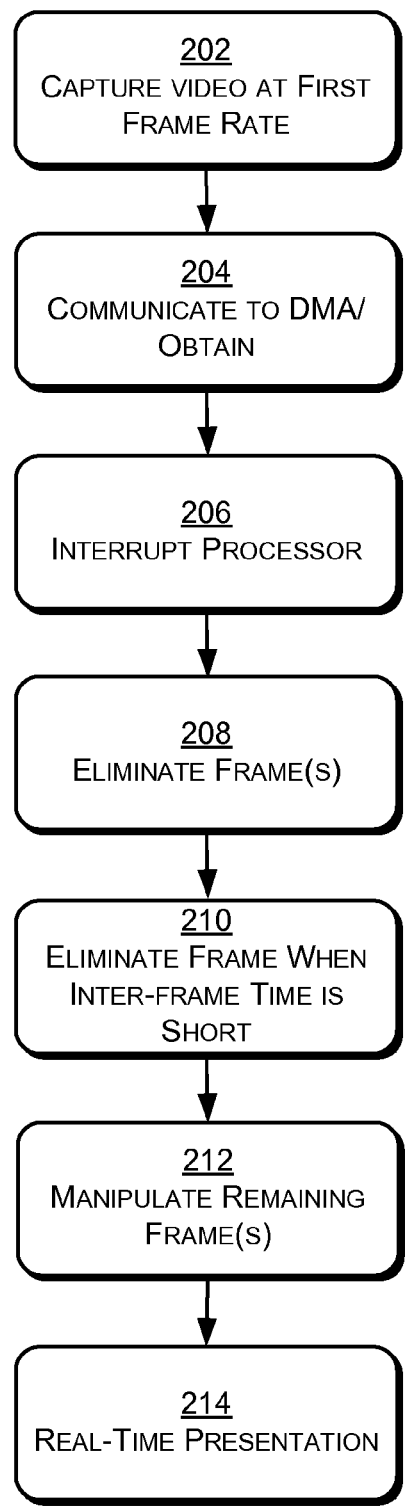
FIG. 2 is a flow diagram depicting a procedure in an exemplary implementation for minimizing video latency using different frame rates.

FIG. 2 discusses exemplary procedures for minimizing video latency using different frame rates. The techniques discussed may be used for real-time media events having contemporaneous video capture and display. For example, a capture device obtaining images may operate at first frame rate, while subsequent processing and/or display may occur at a second frame rate which is less than the first frame rate. These techniques may reduce the inter-frame latency (for the resultant video) and, as a result, the end-to-end latency between capture and display in comparison to using a common frame rate as generally discussed above.

In implementations, video may be captured 202 at a first frame rate. For example, a webcam may capture frames at a high frame rate in comparison to the frame rate specified for a real-time media application using the captured video.

Once captured, the frames may be forwarded to the DMA for processing. For example, the video may be processed to reduce noise, prepare the data for transmission to a target remote device and so on.

The captured video frames may be communicated 204 to memory, such as to a DMA, which may buffer the frames forming the video prior to processing. For example, the video content is communicated through a USB port 108 into the DMA for temporary storage such as may be used in conjunction with real-time applications. One or more frames may be eliminated in various ways. For example, frames may be eliminated as the frame arrives at the DMA, a frame may be temporarily stored, or the frame may be discarded prior to receiving the frame boundary in memory (e.g., for a frame to be dropped). While a first frame may be stored in memory via the DMA, a subsequent frame may be eliminated or unused.

For example, if a second frame (or other frame subsequent to a first frame) reaches the DMA, as the DMA is interrupting 206 the processor with the first frame, the second frame may be eliminated 208. A third frame, or another frame subsequent to the second frame, may be used as if the third frame was the second frame. Subsequent frames may be handled in a similar manner. For example, a system operating in conformance with the current implementations may eliminate every other frame, may eliminate one out of three frames, and so on.

A desired second frame rate may be obtained by dropping additional frames. Thus, the latency may be reduced in comparison to a system which uses a common frame rate. For example, while an application may specify a fifteen frame per second rate, the video may be captured at thirty frames per second so that a projected two frame latency may be reduced from approximately 133.33 msec to approximately 66.67 msec.

For instance, a frame may be eliminated when a preceding frame boundary is determined in the DMA. The DMA may eliminate a second frame reaching the DMA as a first frame boundary is determined in the DMA.

In further implementations, a received frame may be eliminated 208 if the interval between the frame being received and a previous frame is less than an application specified time. For example, a frame reaching the DMA may be eliminated if the time between the currently received frame and a previous frame is less than what is specified by a DMA controller (i.e., the DMA is receiving images more rapidly than is specified for a target application). Eliminating frames may extend the interval between frames so that CPU and/or the network may not have to handle additional data. For instance, if the frames are received at a faster frame rate, frames may be dropped to minimize CPU and/or network overhead.

In implementations, the remaining frames, i.e., the frames passed on for processing may be averaged, regions of the images manipulated 212 (such as a region associated with motion) and so on. In this manner, the remaining images may be manipulated to improve the overall video and/or audio experience. For example, the video is used in a real-time presentation 214.

Figure 3:
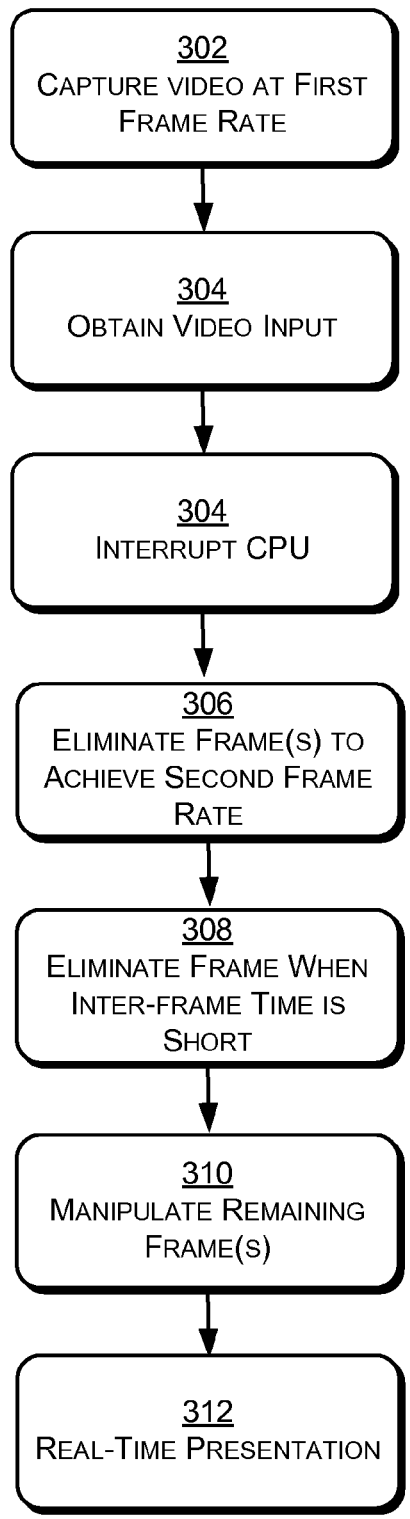
FIG. 3 is a flow diagram depicting a procedure in an exemplary implementation for eliminating a frame from video input prior to processing.

FIG. 3 discusses exemplary techniques for eliminating a frame from video input prior to processing. In implementations, the techniques discussed herein may be used to reduce or minimize latency in real-time video and/or audio applications. Additionally, the procedures may minimize the burden on a CPU by eliminating one or more frames prior to processing.

Captured video 302 input may be obtained 304 in memory. For example, a first frame may be obtained 304 in memory from a webcam or other suitable image capture device via a USB or other port. The frames may be obtained at a first frame rate. While a two frame latency may occur, one or more frames included in a video may be received at a high frame rate which is associated with a capture device rate.

One or more subsequent frames may be eliminated from the video input as desired. For example, a frame entering a DMA contemporaneously with the DMA interrupting 304 the CPU may be eliminated 306. A second frame entering the DMA may be eliminated if the second frame enters at the approximate time the DMA interrupts the CPU with a first frame that is defined in memory. The first frame boundary may be within the DMA (i.e., the data forming the frame is within memory (e.g., has been buffered) and may be generally ready for processing. In other instances, the frame to be eliminated may be received in the DMA, may be partially received and so on. Additional frames may be eliminated as desired.

Elimination of one or more frames may result in a video stream which has a lower frame rate than that of the first frame rate. For instance, additional frames may be eliminated 306 so the retained frames have a slower frame rate. Thus, if every other frame is eliminated from a thirty frame per second video, the video for processing may have an effective second rate of approximately fifteen frames per second. In this situation, the frame latency may be reduced (presuming a two frame delay for capture/transfer) from approximately 133.33 msec to approximately 66.67 msec while the effective frame rate may meet an application frame rate of fifteen frames per second. While the latency may be reduced, the processor demand may not increase in comparison to the difference between a processor handling thirty frames per second in comparison to handling fifteen frames per second. As a result, the remaining frames (i.e., the frames surviving elimination) may be processed and presented as if the video was captured at the second or software frame rate.

In implementations, the remaining frames, i.e., the frames passed on for processing may be averaged, regions of the images manipulated 310 (such as a region associated with motion) and so on. In this manner, the remaining images may be manipulated to improve the overall video and/or audio experience, such as in real-time presentation 312.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A method comprising:
obtaining a video at a first frame rate;
providing the video at the first frame rate to a direct memory access (DMA);
eliminating, by the DMA, at least one frame of the video;
providing the video, with the eliminated at least one frame, to a central processing unit; and
processing, by the central processing unit, the video, with the eliminated at least one frame, at a second frame rate which is less than the first frame rate.

2. The method as described in claim 1, further comprising storing at least a portion of the video via the DMA.

3. The method as described in claim 1, wherein the eliminated at least one frame is a frame received after the central processing unit is interrupted by the DMA.

4. The method as described in claim 1, further comprising presenting the video, with the eliminated at least one frame, in real-time with obtaining the video.

5. The method as described in claim 1, wherein eliminating occurs once a frame boundary is determined by the DMA.

6. The method as described in claim 1, further comprising averaging one or more frames included in the video with the eliminated at least one frame.

7. The method as described in claim 1, further comprising eliminating a next received frame when an inter-frame time between the next frame and a previous frame is less than an application-defined inter-frame time.

8. The method as described in claim 1, wherein the first frame rate is at least twice the frame rate as the second frame rate.

9. The method as described in claim 1, wherein a latency between capturing and processing is less than two times a per frame rate for the second frame rate.

10. One or more computer-readable memory devices comprising computer-executable instructions that, when executed, direct a computing system to:
obtain a video input; determine a first frame boundary of the video input; interrupt, by a direct memory access (DMA), a processing unit with a first frame of the video input; eliminate, by the DMA, a subsequent frame from the video input, once the DMA has interrupted the processing unit with the first frame; provide the video input, with the eliminated subsequent frame, to the processing unit; and process, by the processing unit, the video input, with the eliminated subsequent frame.

11. The one or more computer-readable memory devices as described in claim 10, wherein the subsequent frame is the frame reaching DMA after the DMA has interrupted a central processing unit.

12. The one or more computer-readable memory devices as described in claim 10, wherein a latency for the video input with the eliminated second frame is approximately one half a per frame rate for a device capturing the video input.

13. The one or more computer-readable memory devices as described in claim 10, further comprising eliminate additional frames from the video input to achieve a desired frame rate.

14. The one or more computer-readable memory devices as described in claim 13, further comprising manipulate non-eliminated video input frames in accordance with at least one of averaging frames, averaging a region in which movement occurs, or sampling.

15. The one or more computer-readable memory devices as described in claim 10, further comprising eliminate a next frame obtained in the DMA when an inter-frame time between the next frame and a previous frame is less than an application defined inter-frame time.

16. A system comprising: a video capture device for capturing video images at a first frame rate; and a direct memory access (DMA) for storing captured video images, the DMA for eliminating a subsequent frame in the captured video images upon interrupting a central processing unit (CPU) with a first frame of the captured video images, and providing the captured video images, with the eliminated subsequent frame, to the CPU, for processing by the CPU.

17. The system as described in claim 16, wherein the system is configured for real-time image handling.

18. The system as described in claim 16, wherein a latency between capturing a frame in the video images and interrupting the CPU is less than two times a per frame rate at which the captured images are provided to a real-time observer.

19. The system as described in claim 16, wherein the DMA eliminates a next received frame when an inter-frame time between the next frame and a previous frame is less than an application defined inter-frame time.

* * * * *